(12) United States Patent
Kim

(10) Patent No.: US 12,065,272 B2
(45) Date of Patent: Aug. 20, 2024

(54) SYSTEM AND METHOD FOR PROVIDING SERVICE ON GOLF COURSE USING FUEL CELL DRONE

(71) Applicant: DOOSAN MOBILITY INNOVATION INC., Yongin-si (KR)

(72) Inventor: Ji Young Kim, Yongin-si (KR)

(73) Assignee: DOOSAN MOBILITY INNOVATION INC., Yongin (KR)

(*) Notice: Subject to any disclaimer, the term of this patent is extended or adjusted under 35 U.S.C. 154(b) by 1032 days.

(21) Appl. No.: 16/975,270

(22) PCT Filed: Feb. 15, 2019

(86) PCT No.: PCT/KR2019/001863
§ 371 (c)(1),
(2) Date: Aug. 24, 2020

(87) PCT Pub. No.: WO2019/168287
PCT Pub. Date: Sep. 6, 2019

(65) Prior Publication Data
US 2020/0407059 A1      Dec. 31, 2020

(30) Foreign Application Priority Data
Feb. 28, 2018   (KR) .................. 10-2018-0024620

(51) Int. Cl.
*B64U 50/00*     (2023.01)
*A63B 24/00*     (2006.01)
(Continued)

(52) U.S. Cl.
CPC .......... *B64U 50/32* (2023.01); *A63B 24/0006* (2013.01); *A63B 69/3605* (2020.08);
(Continued)

(58) Field of Classification Search
CPC .... B64U 50/32; B64U 10/13; B64U 2201/20; B64U 2101/30; G06T 7/70;
(Continued)

(56) References Cited

U.S. PATENT DOCUMENTS

2008/0182685 A1* 7/2008 Marty .................... A63B 69/38
                                                                  473/407
2016/0351089 A1* 12/2016 Salem .................... G05D 1/104
2017/0161561 A1   6/2017 Marty et al.

FOREIGN PATENT DOCUMENTS

JP          6204635 B1    9/2017
KR    20180019276 A *    8/2016
(Continued)

*Primary Examiner* — Tiffany P Young
(74) *Attorney, Agent, or Firm* — Harvest IP Law, LLP

(57) ABSTRACT

A system and a method for providing service on a golf course using a fuel cell drone using a hydrogen fuel cell as a power source to provide various services while preventing a rounding delay of golfers are provided. A fuel cell drone of a system for providing service on a golf course may include a hydrogen fuel tank in which hydrogen is charged, a power pack configured to generate power to drive the fuel cell drone using the hydrogen in the hydrogen fuel tank, and a controller configured to move the fuel cell drone to a docking station or a gas supply place in response to determining that an amount of hydrogen remaining in the hydrogen fuel tank is below a set value.

10 Claims, 7 Drawing Sheets

(51) Int. Cl.

| | |
|---|---|
| *A63B 69/36* | (2006.01) |
| *A63B 71/06* | (2006.01) |
| *B64D 37/30* | (2006.01) |
| *B64F 1/28* | (2006.01) |
| *B64U 50/32* | (2023.01) |
| *G06T 7/70* | (2017.01) |
| *G06V 20/10* | (2022.01) |
| *G06V 20/13* | (2022.01) |
| *G06V 20/17* | (2022.01) |
| *G06V 20/40* | (2022.01) |
| *G06V 40/16* | (2022.01) |
| *G06V 40/20* | (2022.01) |
| *G06V 40/50* | (2022.01) |
| *H01M 8/04082* | (2016.01) |
| *H01M 8/04746* | (2016.01) |
| *B64U 10/13* | (2023.01) |
| *B64U 101/30* | (2023.01) |

(52) U.S. Cl.
CPC .......... *A63B 71/0622* (2013.01); *B64D 37/30* (2013.01); *B64F 1/28* (2013.01); *G06T 7/70* (2017.01); *G06V 20/10* (2022.01); *G06V 20/13* (2022.01); *G06V 20/17* (2022.01); *G06V 20/41* (2022.01); *G06V 40/161* (2022.01); *G06V 40/23* (2022.01); *G06V 40/50* (2022.01); *H01M 8/04082* (2013.01); *H01M 8/04746* (2013.01); *A63B 2024/0037* (2013.01); *A63B 2071/0638* (2013.01); *A63B 2220/05* (2013.01); *A63B 2220/806* (2013.01); *B64U 10/13* (2023.01); *B64U 2101/30* (2023.01); *B64U 2201/20* (2023.01); *G06T 2207/10016* (2013.01); *G06T 2207/30224* (2013.01); *H01M 2250/20* (2013.01)

(58) Field of Classification Search
CPC . G06T 2207/10016; G06T 2207/30224; A63B 69/3605; A63B 24/0006; A63B 71/0622; A63B 2024/0037; A63B 2071/0638; A63B 2220/05; A63B 2220/806; G06V 20/17; G06V 40/161; G06V 20/41; G06V 20/10; G06V 40/23; G06V 40/50; G06V 20/13; B64D 37/30; B64F 1/28; H01M 8/04082; H01M 8/04746; H01M 2250/20
USPC .......................................................... 701/3
See application file for complete search history.

(56) References Cited

FOREIGN PATENT DOCUMENTS

| KR | 1020160122383 A | 10/2016 |
| KR | 1020170014837 A | 2/2017 |
| KR | 101778890 B1 | 9/2017 |
| KR | 1020180019276 A | 2/2018 |
| WO | WO-2017098570 A1 * | 6/2017 |

* cited by examiner

SYSTEM AND METHOD FOR PROVIDING SERVICE ON GOLF COURSE USING FUEL CELL DRONE

CROSS REFERENCE TO RELATED APPLICATIONS

This application is a National Stage of International Application No. PCT/KR2019/001863 filed Feb. 15, 2019, claiming priority based on Korean Patent Application No. 10-2018- 0024620 filed Feb. 28, 2018.

TECHNICAL FIELD

Apparatuses and methods consistent with exemplary embodiments relate to a system and a method for providing service on a golf course using a fuel cell drone, and more particularly, to a system and a method for providing service on a golf course using a fuel cell drone supporting a golfer's use of a golf course in a golf course.

DESCRIPTION OF THE RELATED ART

Recently, as golf facilities such as a screen golf course and an indoor golf driving range increase, golf is gradually developing as one of the most popular sports in Korea.

As a golf population increases, golfers who go out on a field (e.g., an outdoor golf course) and are rounding (i.e., going through each course and playing golf) are increasing.

Accordingly, research for supporting golfers' rounding through various latest technologies is being conducted in the golf course. For example, the golf course has been researched on the technology of servicing flying distances of the golfer, course information of the golf course, and the like using a drone.

However, because the drone uses a battery as a power source, there is a problem in that a flight (i.e., an operation) is possible for about 30 minutes, so that it is difficult to be applied to the golf rounding, which takes about 3 to 4 hours upon rounding.

In addition, because the drone uses most of the power source in the battery for flying and photographing, there is a problem in that it is difficult to provide various services which require additional power.

In addition, because the drone uses the battery as a power source, the battery replacement or a charging cycle is short, and a charging time is long, resulting in inconvenience of golfers that the rounding is delayed.

In addition, if an additional module is mounted on the drone to provide various services on the golf course through the drone, there is a problem in that an operating time of the drone may be rapidly reduced due to the power consumption of the additional module, thereby providing only a limited service.

SUMMARY

Aspects of one or more exemplary embodiments provide a system and a method for providing service on a golf course using a fuel cell drone, which provide various services upon golf rounding through the fuel cell drone using a hydrogen fuel cell as a power source, thereby providing various services while preventing rounding delay of the golfers.

Aspects of one or more exemplary embodiments also provide a system and a method for providing service on a golf course using a fuel cell drone, which provide various services such as swing analysis, course information, and product recommendation through the golfer photographing of a fuel cell drone, thereby facilitating the rounding of the golfer.

According to an aspect of an exemplary embodiment, there is provided a fuel cell drone of a system for providing service on a golf course including: a hydrogen fuel tank in which hydrogen is charged, a power pack configured to generate power to drive the fuel cell drone using the hydrogen in the hydrogen fuel tank, and a controller configured to move the fuel cell drone to a docking station or a gas supply place in response to determining that an amount of hydrogen remaining in the hydrogen fuel tank is below a set value.

The controller may block a drive power output of the power pack after the fuel cell drone is docked in the docking station.

The hydrogen fuel tank may include a main hydrogen fuel tank and a sub-hydrogen fuel tank, the fuel cell drone may further include a hydrogen supply valve configured to selectively supply the hydrogen from the main hydrogen fuel tank and the sub-hydrogen fuel tank to the power pack, and the controller may control, in response to determining that the amount of hydrogen remaining in the main hydrogen fuel tank is less than the set value, the hydrogen supply valve to block the hydrogen supply from the main hydrogen fuel tank to the power pack and to supply the hydrogen in the sub-hydrogen fuel tank to the power pack.

The fuel cell drone may further include: a golfer register configured to register a plurality of golfers and golfer terminals belonging to a rounding group, a camera configured to photograph a golfer image and a swing video, an analysis information provider configured to transmit swing analysis information corresponding to the swing video to the detected golfer terminal, and a drop location detector configured to detect a ball drop location based on the swing video.

The golfer register may register the golfer by storing golfer information and golfer terminal information corresponding to the golfer image in connection with the golfer image.

The fuel cell drone may further include a course information provider configured to detect golfer terminal information of the golfer preparing for swing based on the golfer image and provide course information to the golfer terminal, wherein the course information provider may detect golfer terminal information connected to the golfer image obtained by photographing the golfer preparing for swing by the camera, and transmit course information including at least one of an image, a notification, a strategy method, current wind direction and wind speed, and temperature of a hole course to a golfer terminal corresponding to the detected golfer terminal information, and the strategy method may include at least one of a club type, a swing direction, and an expected ball drop location.

The fuel cell drone may further include a movement location detector configured to detect a movement location based on ball drop locations of the plurality of golfers, wherein the movement location detector may detect one of the ball drop location detected by the drop location detector and an average intermediate point of the ball drop locations of the plurality of golfers as the movement location.

The fuel cell drone may further include a swing order setter configured to set a swing order of the plurality of golfers based on the ball drop location and a hole cup.

The swing order setter may calculate a distance between the ball drop locations of the plurality of golfers and the hole cup, and arrange the calculated distances in descending order to set the swing order of the plurality of golfers.

The controller may control a flight module to move to the docking station, if a first half round of the rounding group is over.

The fuel cell drone may further include a recorder configured to record at least one of scores, green in regulations, whether the ball is landed on a fairway, and a number of putts of the plurality of golfers based on the swing video.

The fuel cell drone may further include a recommendation information provider configured to transmit to the golfer terminal recommendation information including at least one of a swing analysis result, brand statistics, club statistics, a size, and a flying distance based on the swing video if the rounding of the rounding group is completed.

According to an aspect of another exemplary embodiment, there is provided a system for providing service on a golf course including: a fuel cell drone and a service providing server configured to generate swing analysis information based on one of a recommended swing video and a practice swing video and the swing video, and transmit the swing analysis information to at least one of the fuel cell drone and the golfer terminal.

According to an aspect of another exemplary embodiment, there is provided a method for providing service on a golf course using a fuel cell drone, the method including: sensing, by a fuel cell drone, an amount of hydrogen remaining in a hydrogen fuel tank, generating, by the fuel cell drone, power to drive the fuel cell drone using the hydrogen in the hydrogen fuel tank, and charging, by the fuel cell drone, hydrogen by being docked to a docking station if the sensed amount of remaining hydrogen is below a set value during flight with a drive power.

The method may further include: registering, by the fuel cell drone, a plurality of golfers and golfer terminals belonging to a rounding group, photographing, by the fuel cell drone, a swing video of the golfer, transmitting, by the fuel cell drone, swing analysis information corresponding to the swing video to the golfer terminal, and detecting, by the fuel cell drone, a ball drop location based on the swing video.

According to the present disclosure, the system and method for providing the service on the golf course using the fuel cell drone may provide various services upon rounding using the fuel cell drone using the hydrogen fuel cell as a power source, thereby minimizing the rounding delay of the golfer.

In addition, the system and method for providing the service on the golf course using the fuel cell drone may provide the golfer with the course information, the swing analysis information, and the like through the fuel cell drone, thereby improving the swing accuracy of the golfer, and inducing the golfer to record a higher score.

Further, the system and method for providing the service on the golf course using the fuel cell drone may provide various services such as selecting the best swing and putter golfer based on the images photographed through the fuel cell drone and recommending products such as clothes, shoes, and clubs.

BRIEF DESCRIPTION OF DRAWINGS

The above and/or other aspects and features will become more apparent from the following detailed description of the exemplary embodiments, taken in conjunction with the accompanying drawings, in which.

DETAILED DESCRIPTION

Figure 1:
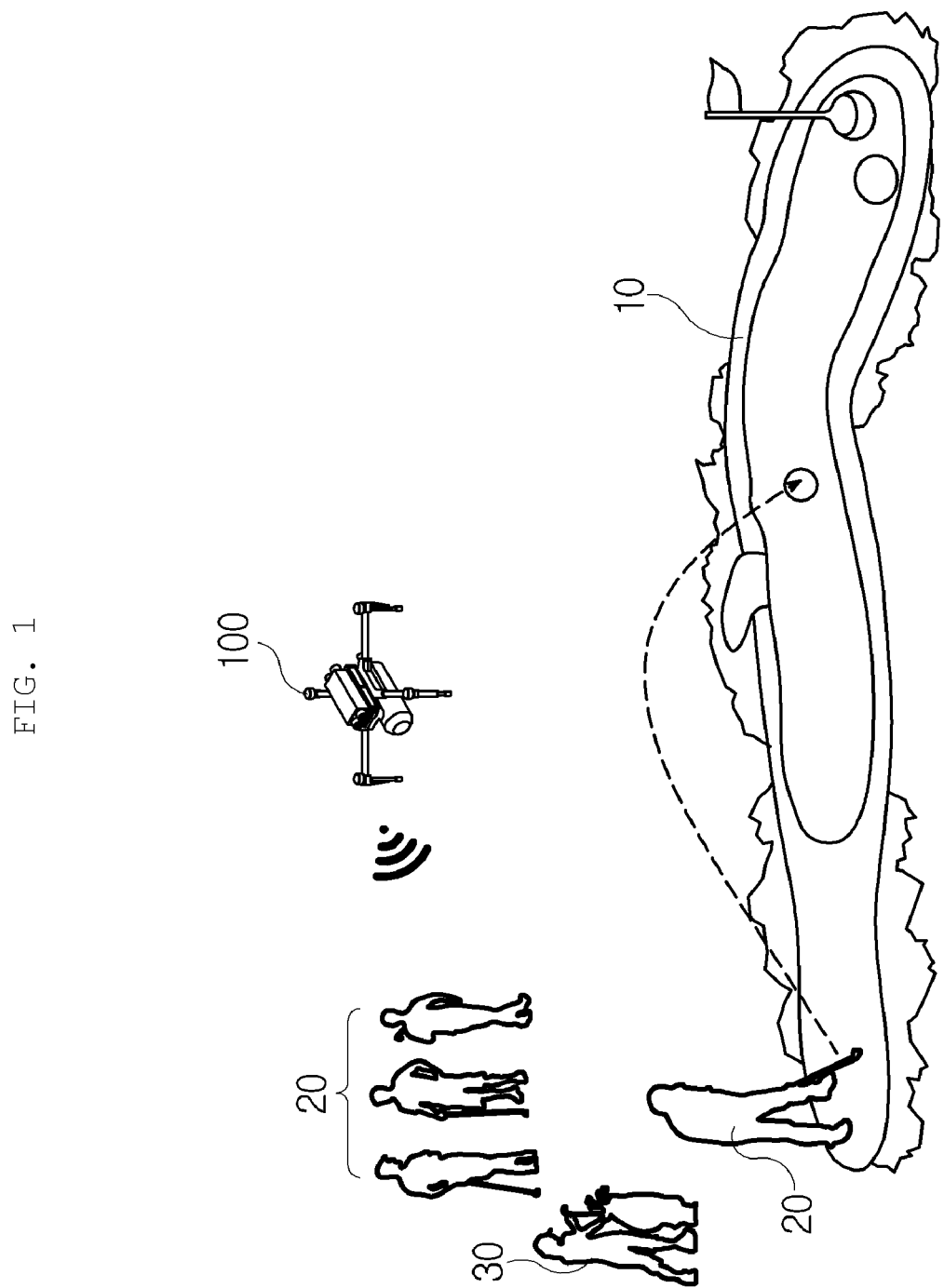
FIG. 1 is a diagram for explaining a system for providing service on a golf course using a fuel cell drone according to an exemplary embodiment.

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

In an exemplary embodiment, "a module," "a unit," or "a part" performs at least one function or operation, and may be realized as hardware, such as a processor or integrated circuit, software that is executed by a processor, or a combination thereof. In addition, a plurality of "modules," a plurality of "units," or a plurality of "parts" may be integrated into at least one module or chip and may be realized as at least one processor except for "modules," "units" or "parts" that should be realized in a specific hardware.

Hereinafter, a system for providing service on a golf course using a fuel cell drone according to an exemplary embodiment will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a diagram for explaining a system for providing service on a golf course using a fuel cell drone according to an exemplary embodiment. Referring to FIG. 1, a system for providing service on a golf course using a fuel cell drone according to an exemplary embodiment is a system for supporting golf rounding of golfers 20 in a golf course.

A golf course 10 is composed of 18 holes. Golf rounding means a rounding group of 2 or more and 4 or less golfers 20 playing around the golf course 10. The golf rounding is composed of 9 holes each divided into a first half and a second half. The golfers 20 take a break while eating snacks and drinks at an intermediate rest area (for example, a snack bar such as a resting place, a cafeteria, or a restaurant) when the first half of the golf rounding is completed and then proceed to the second half of the golf rounding. Each of the first half and the second half of the golf rounding takes about 2 hours to 2 hours and 10 minutes of play time.

Accordingly, a fuel cell drone 100 uses a hydrogen fuel cell capable of flying for a long time as a power source.

The hydrogen fuel cell has high output energy density per weight compared to a battery, so that the hydrogen fuel cell may be mounted on a commercial (i.e., an industrial) drone to fly for a long time.

If a weight ratio (e.g., weights of power pack and drone body) of a power pack (e.g., a fuel cell stack, a fuel cell controller, and a hydrogen fuel tank) to the weight of the drone is about 0.2 to 3, the hydrogen fuel cell may enable flying for a longer time than the battery.

Particularly, as a size of the drone increases, a weight of the drone body increases. The battery has an output energy density per weight of about 120 W/kg to 200 W/kg, whereas the hydrogen fuel cell has an output energy density per weight of about 400 W/kg to 1000 W/kg, so that it is advantageous to use the hydrogen fuel cell as the power source for a large drone to fly for a long time.

The reason why the drone flies for a long time by increasing only an amount of hydrogen is because a size of the stack which produces electricity does not increase linearly in proportion to energy output, and hydrogen, the fuel that produces electricity, is also very light.

Accordingly, if the hydrogen fuel cell is used, it is possible to significantly increase a flight time, which is a problem of the drone using the battery as the power source. The flight time of the drone using the battery as the power source is actually less than 20 minutes or less than 30 minutes, whereas the drone using the hydrogen fuel cell as the power source may fly for about 2 hours or more and also fly for a longer time by further increasing the amount of hydrogen.

Figure 2:
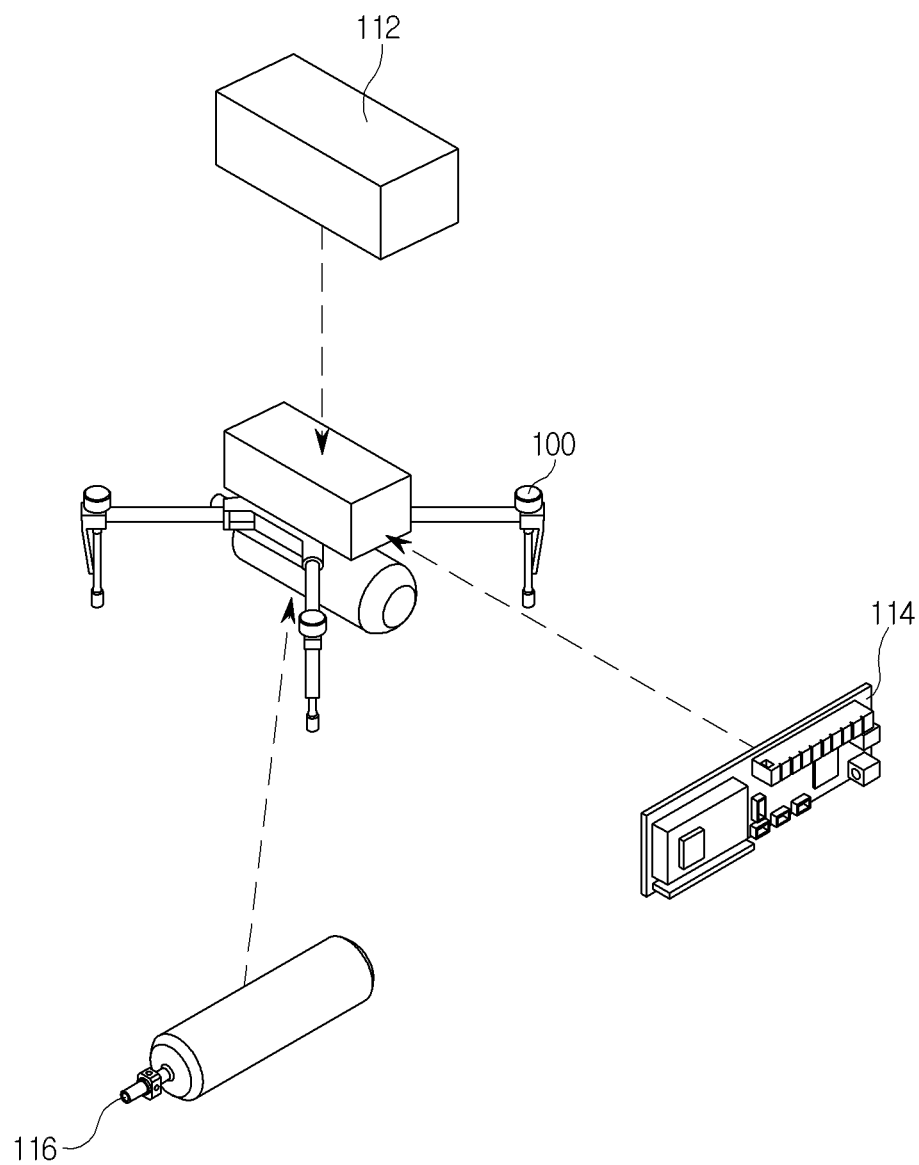
FIG. 2 is a diagram for explaining the fuel cell drone illustrated in FIG. 1.

FIG. 2 is a diagram for explaining the fuel cell drone 100 illustrated in FIG. 1. Referring to FIG. 2, the fuel cell drone 100 using the hydrogen fuel cell as the power source may include a power pack 112 including a fuel cell stack module configured to generate electricity, a control board 114 configured to perform a control such as providing a drive signal to the power pack 112, and a hydrogen fuel tank 116.

The drone 100 may further include a flight module configured to perform a flight operation. Here, the flight module may include a rotor propeller or a fixed wing and an electric motor configured to drive the rotor propeller or the fixed wing.

The power pack 112 generates a power source for driving the flight module using the hydrogen charged in the hydrogen fuel tank 116. The power pack 112 may be formed integrally with the control board 114, or may be formed separately therefrom. The fuel cell drone 100 uses hydrogen contained in the hydrogen fuel tank 116 as a power source (that is, fuel). The hydrogen fuel tank 116 and the power pack 112 may be mounted on an upper portion and a lower portion of the fuel cell drone 100 airframe, or separately mounted on the upper portion and the lower portion thereof.

The fuel cell drone 100 may include the hydrogen fuel tank 116 mounted on the upper portion of the fuel cell drone 100, and the power pack 112 mounted on the lower portion of the fuel cell drone 100. Alternatively, the fuel cell drone 100 may include the power pack 112 mounted on the upper portion of the fuel cell drone 100, and the hydrogen fuel tank 116 mounted on the lower portion thereof. The hydrogen fuel tank 116 and the power pack 112 may be integrally manufactured and mounted on the fuel cell drone 100. A weight of the hydrogen fuel tank 116 varies depending on a capacity thereof, and for example, the weight of 3 L (liter) hydrogen fuel tank 116 is about 1 kg to 1.5 kg, and 10 L hydrogen fuel tank 116 is about 3 to 4 kg. The hydrogen fuel cell for a drone requires a power pack manufactured as light as possible, and it is required to easily recharge hydrogen in the fuel cell drone 100. The hydrogen fuel tank 116 for a vehicle is fixed inside the vehicle, but the hydrogen fuel tank 116 for a drone may also be fixed to and detached from the fuel cell drone 100.

The fuel cell drone 100 may include a plurality of hydrogen fuel tanks 116. For example, the fuel cell drone 100 may include a main hydrogen fuel tank and a sub-hydrogen fuel tank, and if the hydrogen in the main hydrogen fuel tank is exhausted, a power source is generated using the hydrogen in the sub-hydrogen fuel tank. The fuel cell drone 100 may include a hydrogen supply valve for selectively supplying the hydrogen in the main hydrogen fuel tank and the sub-hydrogen fuel tank to the power pack.

A conventional drone using a battery as a power source may not be applied to a field requiring flight for a long time such as golf rounding because it requires a long time charging for about 1 hour or more until the battery is fully charged when discharged.

On the other hand, because the fuel cell drone 100 according to the exemplary embodiment uses hydrogen fuel as a power source, the fuel cell drone 100 may be charged or replaced within a few minutes and thus applied to the field requiring a long-term operation such as golf rounding. That is, because the fuel cell drone 100 uses the hydrogen charged in the hydrogen fuel tank 116 as the power source, it is possible to fly for a longer time than the conventional drone using the battery.

In addition, the fuel cell drone 100 may have a hydrogen charging time of the hydrogen fuel tank 116 within a few minutes, like gasoline injection/LPG vehicle charging, thereby minimizing an operation stop time to provide continuous service in the field which requires the long-term operation.

Figure 3:
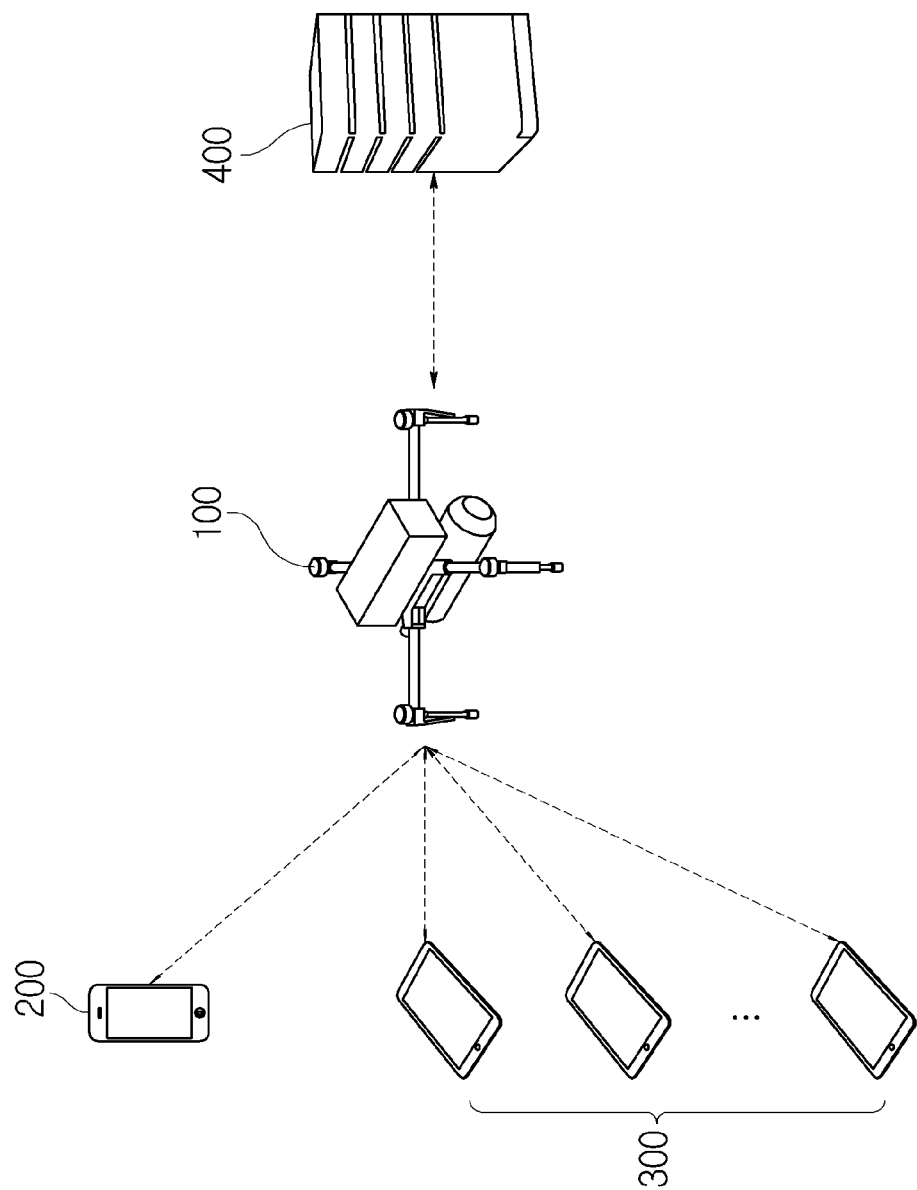
FIG. 3 is a diagram for explaining a configuration of the system for providing service on the golf course using the fuel cell drone according to the exemplary embodiment.

FIG. 3 is a diagram for explaining a configuration of the system for providing service on the golf course using the fuel cell drone according to the exemplary embodiment. Referring to FIG. 3, the system for providing service on the golf course using the fuel cell drone 100 may include the fuel cell drone 100, a caddy terminal 200, a golfer terminal 300, and a service providing server 400 to support the golf rounding of the golfers 20.

The caddy terminal 200 transmits a golfer registration command of the golfer terminal 300. The caddy terminal 200 transmits the golfer registration command to the fuel cell drone 100 when the golfers 20 enter a first hole of the golf course 10.

The fuel cell drone 100 registers and manages the golfer 20 and the golfer terminal 300.

Here, the fuel cell drone 100 registers and manages golfer information including personal information such as a name, an address, and a telephone number of the golfer 20. Alternatively, the fuel cell drone 100 may register and manage golfer information including information (for example, nickname, unique number, and the like) which may identify the golfers 20 belonging to the rounding group.

The fuel cell drone 100 registers the golfer 20 when receiving the golfer registration command of the caddy terminal 200. The fuel cell drone 100 is set in an automatic flight mode to start flying when receiving the golfer registration command from the caddy terminal 200. The fuel cell drone 100 flies to a tee box in a first hole to photograph the golfer 20 located in the tee box. The fuel cell drone 100 photographs a golfer image including a face of the golfer 20. The fuel cell drone 100 transmits the photographed golfer image to the service providing server 400.

The service providing server 400 identifies the golfer 20 based on the golfer image received from the fuel cell drone 100. The service providing server 400 may store the golfer information provided when the golf course is booked in connection with a golfer picture, and detect golfer information corresponding to the golfer image received from the fuel cell drone 100 to identify the golfer 20. The service providing server 400 transmits the detected golfer information to the fuel cell drone 100.

The fuel cell drone 100 receives the golfer information about the golfer image from the service providing server 400. The fuel cell drone 100 connects and stores the golfer image and the golfer information to complete golfer registration.

The fuel cell drone 100 may also register the golfers 20 located around the tee box in the first hole at the same time. The fuel cell drone 100 photographs a golfer image including faces of the golfers 20 located around the first hole. At this time, the fuel cell drone 100 may photograph one golfer image for each golfer 20, or photograph a plurality of golfers 20 as one golfer image. The fuel cell drone 100 transmits the photographed golfer image to the service providing server 400.

The service providing server 400 detects the face information of the golfer 20 from the golfer image received from the fuel cell drone 100, and identifies the golfer 20 based on the detected face information. The service providing server 400 may connect and store the golfer information provided when a golf course is booked and the golfer image, and detect golfer information corresponding to the golfer image to identify who the corresponding golfer 20 is. The service providing server 400 transmits the detected golfer information to the fuel cell drone 100.

The fuel cell drone 100 receives golfer information for each of the golfers 20 included in the golfer image from the service providing server 400. For example, the fuel cell drone 100 connects and stores the golfer image and the golfer information to complete the golfer registration.

The fuel cell drone 100 registers information of the golfer terminal 300. The fuel cell drone 100 registers information such as a smartphone or tablet of the registered golfer 20 as information of the golfer terminal 300. The fuel cell drone 100 transmits a golfer terminal registration request including the golfer image or the golfer information to the caddy terminal 200. The caddy 30 requests the golfers 20 to register their terminals when receiving a golfer terminal registration request from the fuel cell drone 100 through the caddy terminal 200. The golfers 20 drive a communication function (for example, WiFi, Zigbee, infrared communication, Bluetooth, Near-Field Communication (NFC), or the like) of the golfer terminal 300 to connect the golfer terminal 300 to the fuel cell drone 100. The fuel cell drone 100 connects the communication with neighboring golfer terminals 300 to register the golfer terminals 300.

If the information registration of the golfer 20 and the golfer terminal 300 is completed, the fuel cell drone 100 notifies start of the golf rounding to the caddy terminal 200 and the golfer terminal 300.

The fuel cell drone 100 transmits course information to the golfer terminal 300.

The fuel cell drone 100 photographs the golfer 20 entering a swing location, and identifies the golfer 20 by comparing the photographed image with a previously stored golfer image. At this time, the fuel cell drone 100 may also receive a swing order of the golfers 20 from the caddy terminal 200 to identify the golfer 20. Here, the swing may be interpreted as motions of the golfer 20 hitting a ball using a club, such as a tee shot, a chip shot, an approach, and putting.

The fuel cell drone 100 detects the golfer terminal 300 of the recognized golfer 20. The fuel cell drone 100 transmits course information to the detected golfer terminal 300. The course information may include an image, a notice, a strategy method, current wind direction and wind speed, a temperature, and the like of a corresponding hole course. The strategy method may include a club type, a swing, a direction, and an expected ball drop location. The expected ball drop location shows an aerial photographed state of the place in which the ball will drop somewhere according to the strategy method.

The fuel cell drone 100 photographs a swing video including the swing motion of the golfer 20.

The fuel cell drone 100 transmits course information to the golfer terminal 300 and then moves to a location capable of photographing the swing motion of the golfer 20. The fuel cell drone 100 photographs a swing video including the swing motion of the golfer 20. The fuel cell drone 100 transmits the swing video to the service providing server 400 together with the golfer information. The fuel cell drone 100 receives swing analysis information from the service providing server 400 and transmits the swing analysis information to the golfer terminal 300.

The fuel cell drone 100 moves to the ball drop location of the ball based on the swing video. The fuel cell drone 100 detects the location and trajectory of the ball hitting the golf club from the swing video, and flies based on the detected location and trajectory to move to the ball drop location. The fuel cell drone 100 photographs the neighboring video including the ball drop location to transmit the photographed neighboring video to the caddy terminal 200 and the golfer terminal 300. The fuel cell drone 100 stores the ball drop location in connection with the golfer information.

If the swing (shot) of all the golfers 20 is completed in the tee box, the fuel cell drone 100 moves to an average intermediate point of the ball drop location of all the golfers 20. When the tee shot of all golfers 20 included in the rounding group is completed, the fuel cell drone 100 detects coordinates of the ball drop locations of the golfers 20. The fuel cell drone 100 extracts the average intermediate point using average values of the coordinates. The fuel cell drone 100 moves to the extracted intermediate point.

The fuel cell drone 100 calculates a distance between a hole cup and the ball drop location. The fuel cell drone 100 sets a swing order of the golfers 20 based on the calculated distance. Generally, because a person farthest from the hole cup first swings, the fuel cell drone 100 sets the swing order so that the golfer 20 having the farthest distance (that is, locations of the hole cup and the ball) has the best priority. Accordingly, the fuel cell drone 100 arranges the calculated distance in descending order to set the swing order of the golfers 20. The fuel cell drone 100 may also transmit the set swing order of the golfers 20 to the caddy terminal 200 and the golfer terminal 300.

The fuel cell drone 100 photographs the golfer 20 based on the swing order. The fuel cell drone 100 photographs the swing video of the golfer 20 according to the swing order. The fuel cell drone 100 transmits the photographed swing video to the service providing server 400 together with the golfer information.

The fuel cell drone 100 transmits a green video to the golfer terminal 300 when the ball of the golfer 20 is located on a green. For example, the green video is composed of a three-dimensional video (image) which may confirm a tilt of the green, a height of the grass, and the like. The fuel cell drone 100 may calculate a distance between the ball and the hole cup, and transmit the calculated distance to the golfer terminal 300 together with the green video.

The fuel cell drone 100 records a scorecard of the golfer 20 when the ball is holed-in and the hole of the golfer 20 is completed. Because the fuel cell drone 100 photographed the swing videos for each swing of the golfer 20, the fuel cell drone 100 records the number of swing videos of the golfer 20 in the scorecard. The fuel cell drone 100 may also receive a score from the caddy terminal 200 to record the scorecard.

In addition to the score of the golfer 20, the fuel cell drone 100 may also record green in regulations, whether the ball is settled on a fairway, the number of putts, and the like. The fuel cell drone 100 may transmit the recorded information to the golfer terminal 300 and the caddy terminal 200.

The fuel cell drone 100 is docked to a docking station to charge hydrogen when the hydrogen is exhausted. At this time, when the docking is completed, the fuel cell drone 100 blocks the drive power source output of the power pack 112 and then charges hydrogen.

The docking station is installed on the snack bar, a cart, or the like. The docking station may be formed on a roof of the cart, or a separate device detachable from the cart. The docking station fixes the fuel cell drone 100 by landing and magnetic force or mechanical configuration of the fuel cell drone 100. The docking station has a spare hydrogen fuel tank 116 fully charged.

The fuel cell drone 100 is docked to the docking station when the hydrogen in the hydrogen fuel tank 116 is a predetermined amount or less. The fuel cell drone 100 cuts off the drive power source output of the power pack 112 when docked to the docking station. The docking station replaces the hydrogen fuel tank 116 mounted on the fuel cell drone 100 with the provided hydrogen fuel tank 116 when docking is confirmed.

Accordingly, the fuel cell drone 100 may replace one or more hydrogen fuel tanks 116 during golf rounding, thereby providing continuous service upon golf rounding.

Because the fuel cell drone 100 uses a hydrogen fuel cell capable of flying for a long time as a power source, when the first half (that is, 9 holes) of the golf rounding is over, the fuel cell drone 100 may be docked to the docking station of the cart to replace or charge the hydrogen fuel tank 116.

Because the fuel cell drone 100 uses the hydrogen fuel cell, a charging time may be minimized. That is, because the hydrogen fuel cell produces electricity using hydrogen as fuel, a separate hydrogen fuel tank 116 is installed on the fuel cell drone 100. If the first half of the golf rounding is over and the hydrogen is exhausted, the fuel cell drone 100 may fly immediately by recharging hydrogen into the hydrogen fuel tank 116 at all times. Accordingly, after the first half of the golf rounding is over, the hydrogen in the hydrogen fuel cell (that is, the hydrogen fuel tank 116) may be charged for a short time during which the golfers 20 rest.

The fuel cell drone 100 may also be charged by replacing the hydrogen fuel tank 116.

For example, the caddy 30 replaces the hydrogen fuel tank 116 mounted on the fuel cell drone 100 with a hydrogen fuel cell (that is, a high-pressure hydrogen fuel cell) filled with hydrogen in a storage place of the hydrogen fuel tank 116 or a storage cabinet of the hydrogen fuel tank 116 next to the snack bar. The replacement method is a method of separating the hydrogen fuel tank 116 attached to the fuel cell drone 100 by a single press, and pushing the recharged hydrogen fuel tank 116 into the fuel cell drone 100 to fix the hydrogen fuel tank 116 to the fuel cell drone 100.

The replaced hydrogen fuel tank 116 is inserted into a cabinet of the hydrogen fuel tank 116 to be recharged. That is, when the hydrogen fuel tank 116 is inserted, the cabinet of the hydrogen fuel tank 116 determines whether to charge by sensing a weight and pressure of the corresponding hydrogen fuel tank 116. The cabinet of the hydrogen fuel tank 116 injects hydrogen gas into the hydrogen fuel tank 116 which needs to be charged through a charging port to charge the hydrogen fuel tank 116. Although it is described above that the caddy 30 manually replaces the hydrogen fuel tank 116 of the fuel cell drone 100, it is understood that this is only an example and other exemplary embodiments are not limited thereto. For example, it is also possible to automatically replace the hydrogen fuel tank 116 through the docking station.

The fuel cell drone 100 charges the hydrogen fuel tank 116 after the golf rounding is completed (that is, after 18 holes are completed).

The fuel cell drone 100 measures operation information for each hole. The fuel cell drone 100 measures operation information including an amount of remaining fuel, an amount of fuel used, and an operation time, and transmits the operation information to the caddy terminal 200. For example, the fuel cell drone 100 measures the pressure of hydrogen fuel, the amount of used fuel, the amount of remaining fuel, and the operation time to transmit them to the caddy terminal 200.

The caddy terminal 200 displays the operation information received from the fuel cell drone 100. The caddy terminal 200 displays the operation information including the amount of remaining fuel, the amount of fuel used, and the operation time. The caddy terminal 200 may display the operation information through pop-up and flashing to get the caddy 30 focused.

When the golf rounding is completed, the fuel cell drone 100 transmits the swing videos of the golfers 20 to the golfer terminal 300. The fuel cell drone 100 extracts the swing video or image including the best swing of each golfer 20 to transmit the swing video or image to the golfer terminals 300 belonging to the same rounding group. The fuel cell drone 100 receives a voting result for the swing videos or images provided from the golfer terminals 300. The fuel cell drone 100 selects the golfer 20 who is the best swing and putter golfer based on the voting result to transmit the selected golfer 20 to the caddy terminal 200 and the golfer terminals 300. The caddy 30 provides a gift to the golfer 20 who is the best swing and putter golfer displayed on the caddy terminal 200.

The fuel cell drone 100 photographs clothes, shoes, accessories, and clubs of the golfers 20 during golf rounding. The fuel cell drone 100 recommends clothes, shoes, accessories, clubs, and the like to the golfers 20 based on the photographed video. At this time, the fuel cell drone 100 recommends an optimal product in consideration of the swing analysis result, brand statistics, club statistics, size, flying distance, and the like of the golfer 20. The fuel cell drone 100 may also recommend a lesson company in connection with an external golf lesson company registered in the service providing server 400.

Figure 4:
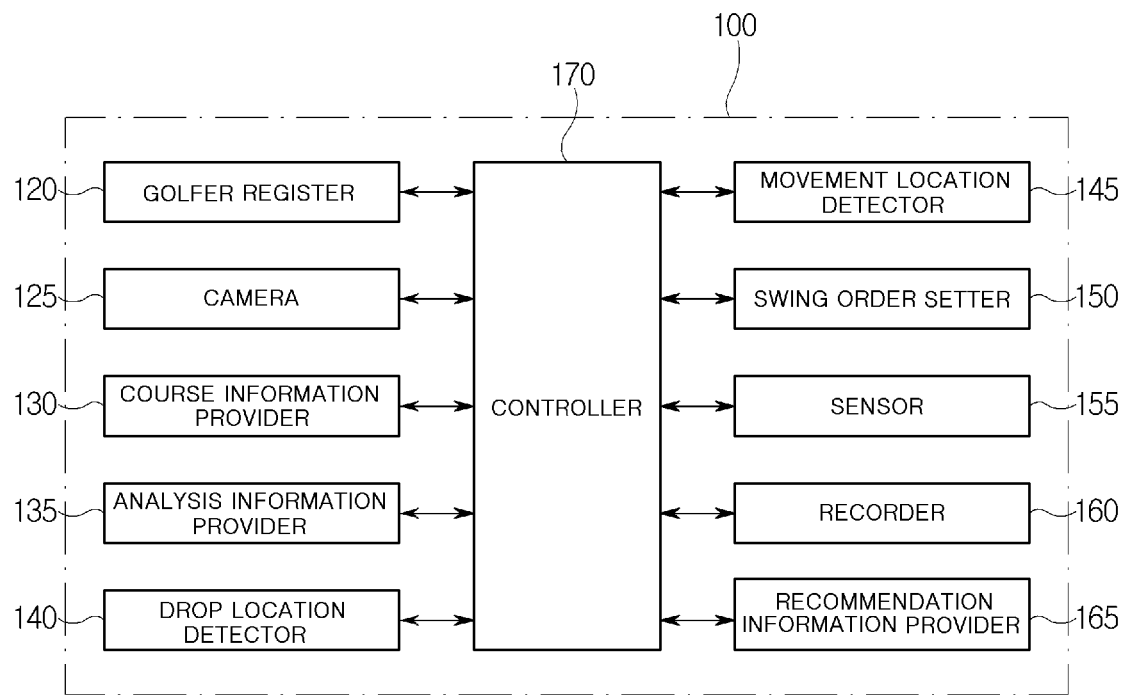
FIG. 4 is a diagram for explaining the fuel cell drone illustrated in FIG. 3.

FIG. 4 is a diagram for explaining the fuel cell drone illustrated in FIG. 3. Referring to FIG. 4, the fuel cell drone 100 may include a golfer register 120, a camera 125, a course information provider 130, an analysis information provider 135, a drop location detector 140, a movement location detector 145, a swing order setter 150, a sensor 155, a recorder 160, a recommendation information provider 165, and a controller 170. Here, the golfer register 120, the camera 125, the course information provider 130, the analysis information provider 135, the drop location detector 140, the movement location detector 145, the swing order setter 150, the sensor 155, the recorder 160, the recommendation information provider 165, and the controller 170 are mounted in a form of a module in the control board 114, or installed in a form of software in a central processor in the control board 114.

The golfer register 120 registers a plurality of golfers 20 and golfer terminals 300 belonging to the rounding group. The golfer register 120 transmits a golfer image to the service providing server 400. The golfer register 120 receives golfer information corresponding to the golfer image from the service providing server 400. The golfer register 120 stores the golfer information received from the service providing server 400 and information of the golfer terminal 300 in connection with the golfer image to register the golfer 20 therein.

The camera 125 photographs a golfer image and a swing video. The camera 125 photographs the golfer image including a face of the golfer 20 and the swing video which is a swing motion of the golfer 20 for tee shot, chip shot, approach, and putting.

The course information provider 130 detects the golfer terminal 300 of the golfer 20 preparing a swing based on the golfer image. The course information provider 130 provides course information to the golfer terminal 300. The course information provider 130 detects the golfer terminal 300 connected to the golfer image photographing the golfer 20 preparing for the swing by the camera 125. The course information provider 130 transmits to the detected golfer terminal 300 the course information including at least one of the image, notice, strategy method, current wind direction and wind speed, and temperature of a hole course. The strategy method may include at least one of a club type, a swing, a direction, and an expected ball drop location.

The course information provider 130 may also detect the golfer terminal 300 based on the swing order received from the caddy terminal 200. The course information provider 130 sequentially detects the golfer terminal 300 based on the swing order, and transmits the course information to the corresponding golfer terminal 300.

The analysis information provider 135 transmits a swing analysis video corresponding to the swing video to the golfer terminal 300. The analysis information provider 135 transmits the swing video to the service providing server 400. The analysis information provider 135 receives the swing analysis video for the swing video from the service providing server 400 to transmit the swing analysis video to the golfer terminal 300. At this time, the swing analysis information is generated by comparing the swing video with one of a recommended swing video and a practice swing video.

The drop location detector 140 detects the ball drop location of the ball based on the swing video. The drop location detector 140 detects the ball drop location of the ball hit by the golfer 20 based on the swing video photographed by the camera 125.

The movement location detector 145 detects the movement location based on the ball drop locations of the plurality of golfers 20. The movement location detector 145 detects the ball drop location detected by the drop location detector 140 as the movement location. The movement location detector 145 may also detect an average intermediate point of the ball drop locations of the plurality of golfers 20 as the movement location.

The swing order setter 150 sets the swing order of the plurality of golfers 20 based on the ball drop location and the hole cup. The swing order setter 150 calculates distances between the ball drop locations of the plurality of golfers 20 and the hole cup. The swing order setter 150 arranges the calculated distances in descending order to set the swing order of the plurality of golfers 20.

The sensor 155 senses the amount of hydrogen remaining in the hydrogen fuel tank 116. If the hydrogen fuel tank 116 includes the main hydrogen fuel tank and the sub-hydrogen fuel tank, the sensor 155 senses the amount of hydrogen remaining in the main hydrogen fuel tank and the amount of hydrogen remaining in the sub-hydrogen fuel tank, respectively. The sensor 155 transmits the sensed amount of hydrogen remaining in the hydrogen fuel tank 116 to the controller 170.

The recorder 160 records at least one of scores, green in regulations, whether the ball is landed on a fairway, and a number of putts of the plurality of golfers 20 based on the swing video.

The recommendation information provider 165 transmits to the golfer terminal 300 recommendation information including at least one of the swing analysis result, the brand statistics, the club statistics, the size, and the flying distance based on the swing video when the rounding of the rounding group is completed.

The controller 170 controls the golfer register 120, the camera 125, the course information provider 130, the analysis information provider 135, the drop location detector 140, the movement location detector 145, the swing order setter 150, the sensor 155, the recorder 160, and the recommended information provider 165.

The controller 170 controls the charging of the hydrogen fuel tank 116 based on the remaining amount of hydrogen sensed by the sensor 155. The controller 170 receives the amount of hydrogen remaining in the hydrogen fuel tank 116 from the sensor 155. The controller 170 moves the fuel cell drone 100 to a docking station or a gas supply device for charging hydrogen in the hydrogen fuel tank 116 if the amount of hydrogen remaining in the hydrogen fuel tank 116 is a set value or less. The fuel cell drone 100 is docked to the docking station to charge hydrogen or replace the hydrogen fuel tank 116. The controller 170 may also charge the hydrogen fuel tank 116 when the first half of the rounding of the rounding group is over.

If the hydrogen fuel tank 116 includes the main hydrogen fuel tank and the sub-hydrogen fuel tank, the controller 170 may also control a hydrogen supply valve to supply the hydrogen in the sub-hydrogen fuel tank to the power pack 112 when the amount of hydrogen remaining in the main hydrogen fuel tank sensed by the sensor 155 is a set value or less.

Although it is described that the fuel cell drone 100 uses the hydrogen fuel cell as the power source, it is understood that this is just an example and one or more other exemplary embodiments are not limited thereto. For example, the fuel cell drone 100 may also use the battery as a power source. At this time, because the fuel cell drone 100 using the hydrogen fuel cell as the power source may fly for a long time, the fuel cell drone 100 may be used during 9 holes by charging once.

On the other hand, because the fuel cell drone 100 using the battery as the power source may fly only for about 20 to 30 minutes with the charged battery, it is difficult for the fuel cell drone 100 to be operated even during one hole.

Accordingly, the fuel cell drone 100 using the battery as the power source may support only some of the above-described services. The fuel cell drone 100 provides service at the first driver swing, lands on the roof of the cart to be charged from the cart, and then goes to the green to provide service.

Because the cart is generally an electric vehicle, the cart may be mounted with a large battery to charge the fuel cell drone 100. The fuel cell drone 100 may be mounted with a plurality of batteries, and may also be replaced with spare batteries when landing on the cart.

Meanwhile, if a lighting tower is installed on the golf course, the installation cost and the operating cost increase, which increases the burden on the operation of the golf course.

Because the fuel cell drone 100 may fly for a long time, the fuel cell drone 100 may also serve as lighting instead of the lighting tower. If the fuel cell drone 100 serves as lighting for a long time, an execution time of the caddy function is reduced, so that the fuel cell drone 100 may serve as lighting for a short time before sunrise and sunset. For example, the fuel cell drone 100 may serve as auxiliary lighting for 40 minutes to 1 hour before sunrise and sunset. A plurality of fuel cell drones 100 may also be used to replace the lighting tower.

A plurality of fuel cell drones 100 are mounted with a lighting device such as an LED searchlight. Each of the plurality of fuel cell drones 100 takes charge of the tee box, the middle of the fairway, and the last putting place and illuminates the ball and the golfer during flight. At this time, the fuel cell drone 100 may illuminate a fixed location, or control a lighting direction to illuminate a specific place according to the situation. To this end, the fuel cell drone 100 may use the power pack 112 or a separate cell as a driving source for lighting.

Figure 5:
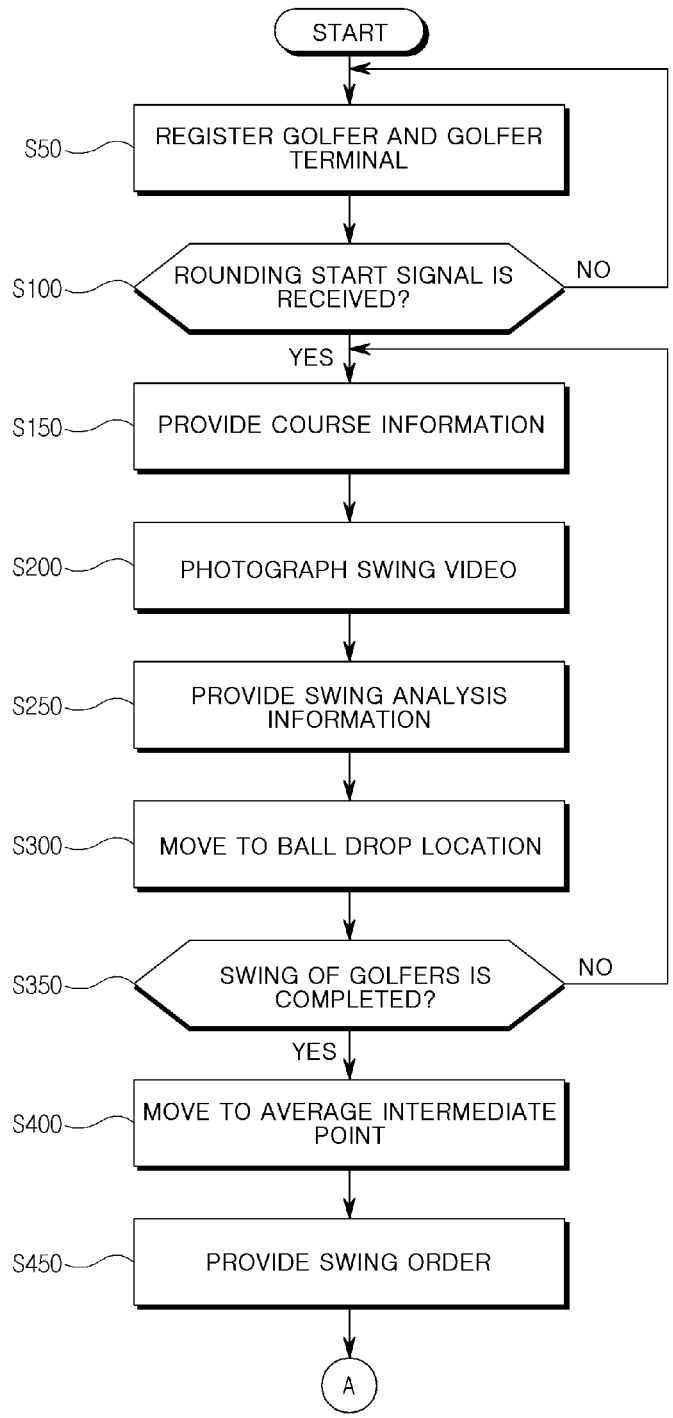
FIGS. 5 and 6 are flowcharts for explaining a method for providing service on a golf course using a fuel cell drone according to an exemplary embodiment.
Figure 6:
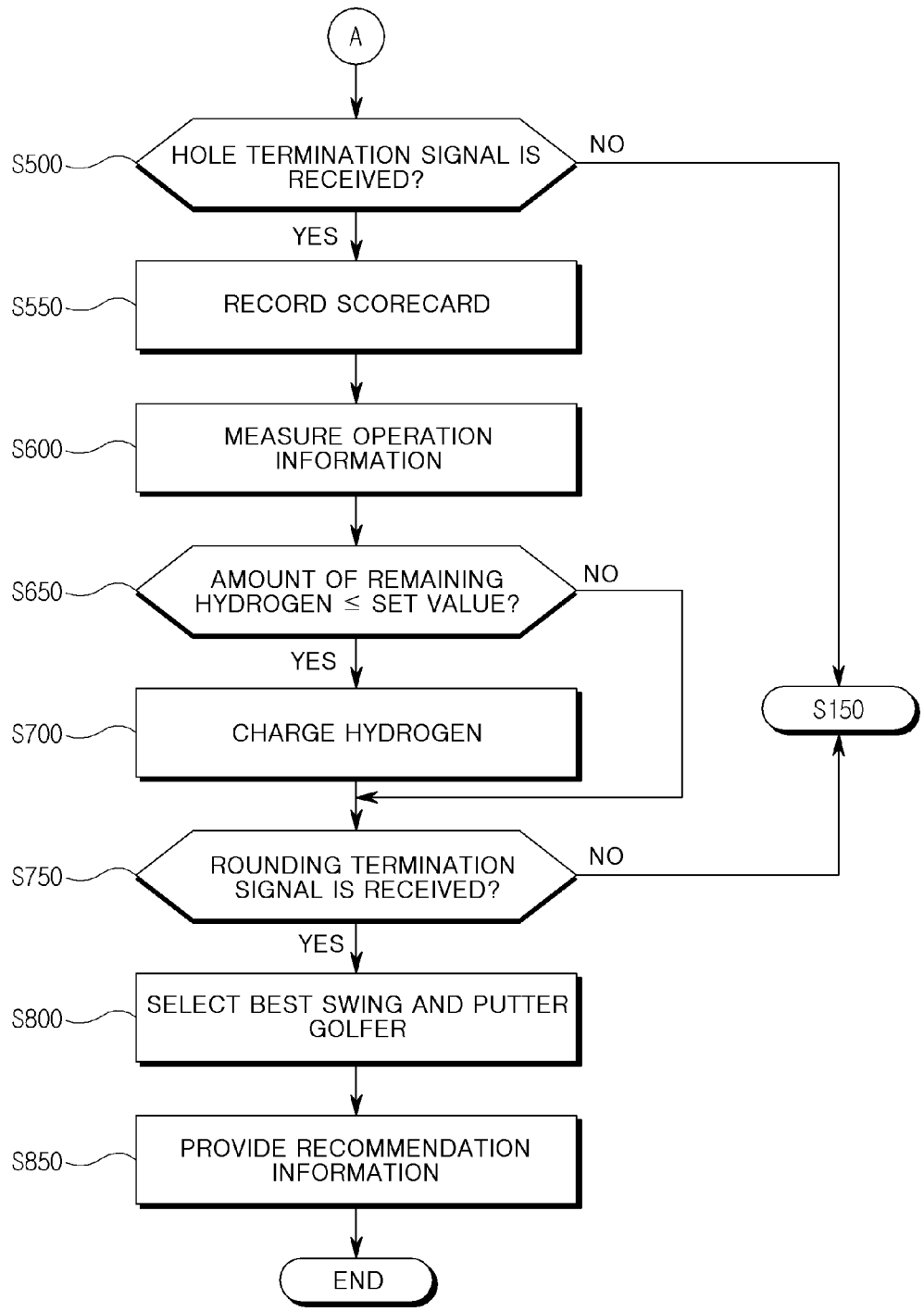
Figure 7:
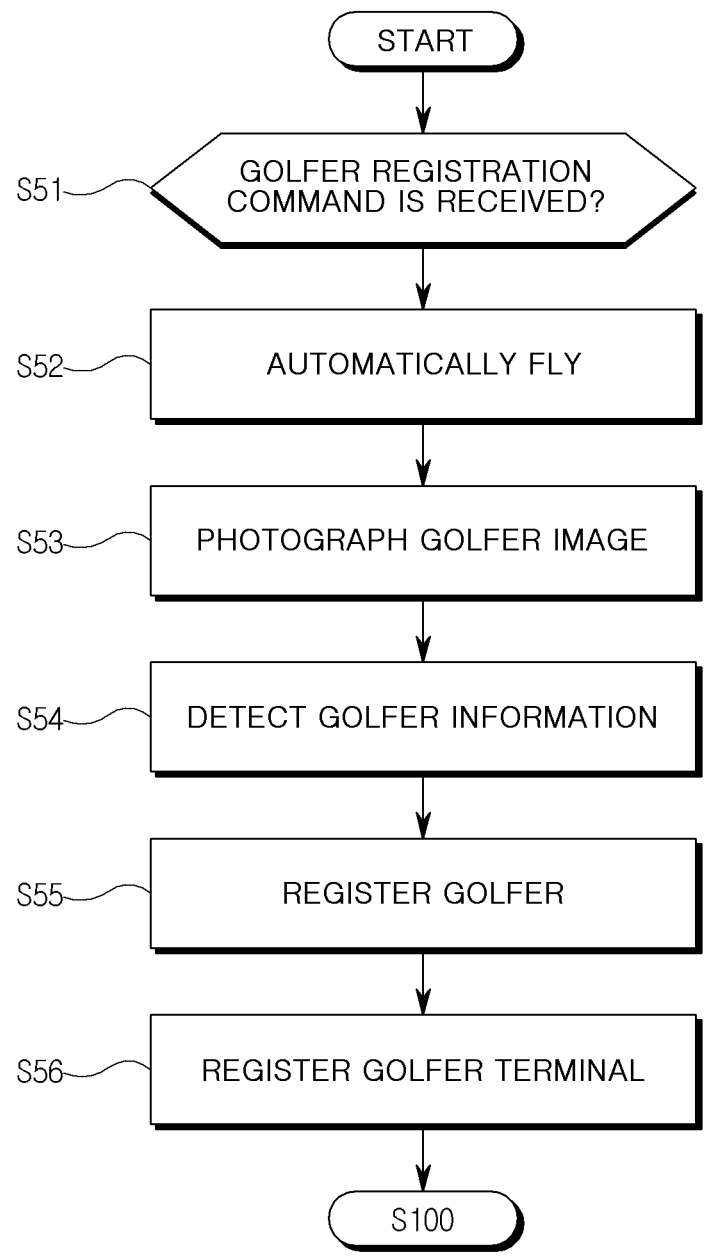
FIG. 7 is a flowchart for explaining a step of registering a golfer and a golfer terminal illustrated in FIG. 5.

Hereinafter, a method for providing service on a golf course using a fuel cell drone according to an exemplary embodiment will be described in detail with reference to the accompanying drawings. FIGS. 5 and 6 are flowcharts for explaining a method for providing service on a golf course using a fuel cell drone according to an exemplary embodiment. FIG. 7 is a flowchart for explaining registering the golfer 20 and the golfer terminal 300 illustrated in FIG. 5.

Hereinafter, it is assumed that first to fourth golfers are included in a rounding group to round a first hole to an eighteen hole.

The first to fourth golfers belonging to the rounding group move to the tee box of the first hole together with the caddy 30 using a cart. The first to fourth golfers carry a first golfer terminal 300 to a fourth golfer terminal 300, respectively, and the caddy 30 carries a caddy terminal 200. The fuel cell drone 100 is mounted on the cart in which the golfers 20 board to move together with the golfers 20. The fuel cell drone 100 may be stored in a storage box near the tee box in the first hole.

Referring to FIGS. 5 and 6, the fuel cell drone 100 registers the golfer 20 and the golfer terminal 300 (operation S50). This will be described in detail with reference to FIG. 7 as follows.

If the rounding of the rounding group is completely prepared, the caddy terminal 200 transmits a golfer registration command to the fuel cell drone 100. That is, when the caddy 30 enters the first hole, which is a starting location of the golf course 10 together with the golfers 20, the caddy terminal 200 transmits the golfer registration command to the fuel cell drone 100. Referring to FIG. 7, when receiving the golfer registration command (operation S51; YES), the fuel cell drone 100 operates in an automatic flight mode to start flying (operation S52). The fuel cell drone 100 moves to a designated location near the tee box of the first hole, which is a starting location of the rounding through automatic flight.

The fuel cell drone 100 photographs the golfers 20 located around the tee box (operation S53). The fuel cell drone 100 photographs golfer images including faces of the first to fourth golfers. The fuel cell drone 100 photographs a plurality of golfer images including the faces of the first to fourth golfers, respectively. The fuel cell drone 100 transmits the plurality of photographed golfer images to the service providing server 400.

The fuel cell drone 100 may also photograph the plurality of golfers 20 at the same time. The fuel cell drone 100 photographs one golfer image including all the faces of the first to fourth golfers. The fuel cell drone 100 transmits the photographed one golfer image to the service providing server 400.

The service providing server 400 detects golfer information based on the golfer image received from the fuel cell drone 100 (operation S54). The golfer information provided when a golf course is booked and a picture including the golfer face are connected and stored in the service providing server 400. The service providing server 400 detects the golfer's face from the golfer's image. The service providing server 400 detects the golfer information connected to the picture including the detected golfer face. The service providing server 400 transmits the detected golfer information to the fuel cell drone 100.

The service providing server 400 may also detect a plurality of golfer information based on the golfer image. The service providing server 400 detects the face of the first golfer from the golfer image, and detects golfer information connected to the picture including the detected face to set the detected golfer information as first golfer information. The service providing server 400 repeats this procedure to set second golfer information to fourth golfer information. The service providing server 400 transmits the set first golfer information to fourth golfer information to the fuel cell drone 100.

The fuel cell drone 100 that receives the golfer information from the service providing server 400 registers the golfers 20 based on the received golfer information and golfer image (operation S55). The fuel cell drone 100 that receives the golfer information from the service providing server 400 connects and stores the golfer image photographed in operation S53 and the golfer information to complete the golfer registration.

The fuel cell drone 100 registers the golfer terminal 300 if the golfer 20 is registered (operation S56). The fuel cell drone 100 registers the golfer terminals 300 carried by the golfers 20 registered in operation S55. The fuel cell drone 100 transmits a golfer terminal registration request including the golfer image or the golfer information to the caddy terminal 200. The caddy 30 requests the golfers 20 to register the terminals upon receiving the terminal registration request through the caddy terminal 200. The golfers 20 drive communication (for example, WiFi, Zigbee, infrared communication, Bluetooth, NFC, or the like) of the golfer terminal 300 to connect the golfer terminal 300 to the fuel cell drone 100. The fuel cell drone 100 connects communication with neighboring golfer terminals 300 to register the golfer terminal 300 therein.

The fuel cell drone 100 repeatedly performs the operation S53 to operation S56 to register all the golfers 20 (that is, the first to the fourth golfers) and the golfer terminals 300. Here, although it is described that the golfer registration is performed by the fuel cell drone 100, it is not limited thereto and may be performed by the service providing server 400.

If the golfer 20 and the golfer terminal 300 are registered, the fuel cell drone 100 transmits a registration completion message to the caddy terminal 200. The caddy terminal 200 that receives the registration completion message displays registration completion on a screen. The caddy 30 confirming the registration completion of the golfer 20 and the golfer terminal 300 informs the golfers 20 of the start of golf rounding.

In addition, when the golfer 20 and the golfer terminal 300 are registered, the fuel cell drone 100 transmits a golf rounding start signal. At this time, the fuel cell drone 100 may also transmit a swing order together with the golf rounding start signal.

Referring to FIGS. 5 and 6, if the fuel cell drone 100 receives the golf rounding start signal (operation S100; YES), the fuel cell drone 100 provides course information to the golfer 20 (operation S150).

The fuel cell drone 100 photographs the golfer 20 preparing for the swing. The fuel cell drone 100 compares the registered golfer image with the photographed golfer image to detect the golfer terminal 300. At this time, the fuel cell drone 100 may also detect the golfer terminal 300 based on the swing order together with the received golf rounding start signal.

The fuel cell drone 100 transmits the course information to the detected golfer terminal 300. The course information may include the image, notice, strategy method, current wind direction and wind speed, temperature, and the like of the corresponding hole course. The strategy method may include a club type, a swing, a direction, an expected ball drop location, and the like. The expected ball drop location shows the aerial photographed state of the place in which the ball will drop somewhere according to the strategy method.

The fuel cell drone 100 may transmit course information including a green video to the golfer terminal 300 if the ball of the golfer 20 is located on a green. For example, the green video is composed of a three-dimensional video (image) which may confirm the slope of the green, the height of the grass, and the like. The fuel cell drone 100 may calculate a distance between the ball and the hole cup, and transmit the calculated distance to the golfer terminal 300 together with the green video.

The fuel cell drone 100 photographs the swing video of the golfer 20 (operation S200).

The fuel cell drone 100 transmits the course information to the golfer terminal 300 and then moves to a location capable of photographing the swing motion of the golfer 20. The fuel cell drone 100 photographs the swing video including the swing motion of the golfer 20. The fuel cell drone 100 transmits the swing video to the service providing server 400 together with the golfer information. For example, the swing video is an image obtained by photographing all motions of the golfer 20 hitting the ball using the club, such as tee shot, chip shot, approach, and putting.

The fuel cell drone 100 provides swing analysis information to the golfer terminal 300 (operation S250).

The fuel cell drone 100 transmits the swing video to the service providing server 400.

The service providing server 400 analyzes the swing video to generate the swing analysis information. The service providing server 400 compares the swing video of the previously registered golfer 20 with the swing video received from the fuel cell drone 100 to generate the swing analysis information.

The service providing server 400 may also compare the swing video with a recommended swing video, a practice swing video, and the like to generate the swing analysis information. The recommended swing video may be a swing video of a professional golfer, a training swing video, and the like, and the practice swing video may be a swing video photographed by the corresponding golfer 20 in indoor and outdoor golf driving ranges.

The service providing server 400 transmits the swing analysis information to the fuel cell drone 100. The fuel cell drone 100 transmits the swing analysis information received from the service providing server 400 to the golfer terminal 300. At this time, the service providing server 400 may directly transmit the swing analysis information to the golfer terminal 300 as well.

The fuel cell drone 100 moves to the ball drop location based on the swing video (operation S300).

The fuel cell drone 100 detects the location and trajectory of the ball hitting the golf club from the swing video, and flies based on the detected location and trajectory to move to the ball drop location. The fuel cell drone 100 photographs the neighboring video including the ball drop location to transmit the photographed neighboring video to the caddy terminal 200 and the golfer terminal 300. The fuel cell drone 100 stores the ball drop location in connection with the golfer information.

The fuel cell drone 100 repeatedly performs the operation S150 and operation S300 until the swing of all the golfers 20 belonging to the rounding group are completed.

If the swing of all the golfers 20 is completed (operation S350; yes), the fuel cell drone 100 moves to the average intermediate point of the ball drop locations of all the golfers 20 belonging to the rounding group to photograph the next swing (operation S400). The fuel cell drone 100 detects the coordinates of the ball drop locations of all the golfers 20 if the swing of all the golfers 20 included in the rounding group is completed. The fuel cell drone 100 extracts the average intermediate point using the average value of the coordinates. The fuel cell drone 100 moves to the extracted average intermediate point.

The fuel cell drone 100 sets the swing order of the golfers 20 (operation S450). The fuel cell drone 100 calculates a distance between the hole cup and the ball drop location of each of the golfers 20. The fuel cell drone 100 sets the swing order of the golfers 20 based on the calculated distances.

Generally, because the person who is farthest from the hole cup first swings, the fuel cell drone 100 sets the swing order so that the golfer 20 having the longest distance (that is, the locations of the hole cup and the ball) has the best priority. Accordingly, the fuel cell drone 100 arranges the calculated distances in descending order to set the swing order of the golfers 20. The fuel cell drone 100 may also transmit the set swing order of the golfers 20 to the caddy terminal 200 and the golfer terminal 300.

The caddy 30 guides the swing order of the golfers 20 based on the swing order, and the golfers 20 swing in their order. At this time, the fuel cell drone 100 moves to the corresponding location (that is, the ball drop location) according to the swing order, or moves the photographing direction of a camera to photograph the swing video of the golfer 20. The fuel cell drone 100 transmits the photographed swing video to the service providing server 400 together with the golfer information.

The caddy 30 transmits a hole termination signal of the corresponding hole to the fuel cell drone 100 if all the golfers 20 succeed in the hole-in, or the hole is terminated. If the fuel cell drone 100 receives the hole termination signal (operation S500; Yes), the fuel cell drone 100 records the scorecards of the golfers 20 (operation S550). The fuel cell drone 100 records the number of swing videos and putting videos of the golfer 20 in the scorecard. The fuel cell drone

100 may also receive a score from the caddy terminal 200 to record the score in the scorecard.

In addition to the score of the golfer 20, the fuel cell drone 100 may also record the green in regulations, whether it is settled in the fairway, the number of putts, and the like. The fuel cell drone 100 may transmit the recorded information to the golfer terminal 300 and the caddy terminal 200.

The fuel cell drone 100 measures operation information for each hole (operation S600). The fuel cell drone 100 measures the operation information including the amount of remaining fuel, the amount of fuel used, and the operation time to transmit the operation information to the caddy terminal 200. For example, the fuel cell drone 100 measures the pressure of hydrogen fuel, the amount of usage, the remaining amount, and the operation time to transmit them to the caddy terminal 200.

The caddy terminal 200 displays the operation information received from the fuel cell drone 100. The caddy terminal 200 displays the operation information including the amount of remaining fuel, the amount of fuel used, and the operation time. The caddy terminal 200 may display the operation information through pop-up and flashing to get the caddy 30 focused.

The fuel cell drone 100, the caddy terminal 200, the golfer terminal 300, and the service providing server 400 repeatedly performs the operation S150, operation S200, operation S250, operation S300, operation S350, operation S400, operation S450, operation S500, operation S550, and operation S600 until the first half of the golf rounding is over.

The fuel cell drone 100 detects the amount of hydrogen remaining in the hydrogen fuel tank 116. If the sensed amount of remaining hydrogen is a set value or less (operation S650; Yes), the fuel cell drone 100 charges hydrogen (operation S700).

The fuel cell drone 100 moves to and is docked to the docking station installed on the cart. The fuel cell drone 100 blocks the output of the power pack 112, and the docking station replaces the hydrogen fuel tank 116 of the docked fuel cell drone 110 to charge hydrogen. The docking station may also inject hydrogen into the hydrogen fuel tank 116 of the docked fuel cell drone 110 to charge hydrogen.

Meanwhile, when the ninth round of rounding ends, the caddy terminal 200 transmits a first half termination signal of the golf rounding to the fuel cell drone 100. The fuel cell drone 100 may also charge hydrogen when receiving the first half termination signal. When the ninth round of rounding ends, the caddy terminal transmits the end signal for the first half of the golf round to the fuel cell drone. At the end of the ninth round, the caddie terminal transmits the first-half end signal of the rounding golf to the fuel cell drone.

The fuel cell drone 100 moves to and is docked to the docking station installed on the cart, the snack bar, or the like.

Because the fuel cell drone 100 uses the hydrogen fuel cell, the charging time may be minimized. That is, because the hydrogen fuel cell may be charged by inserting hydrogen, the charging time is very short unlike the battery using power. Accordingly, after the first half of the golf rounding is terminated, it is possible to charge the hydrogen fuel cell for a short time while the golfers 20 are resting.

The fuel cell drone 100 may also be charged by replacing the hydrogen fuel tank 116. For example, the caddy 30 may replace the hydrogen fuel tank 116 mounted on the fuel cell drone 100 with the hydrogen fuel tank 116 (that is, high-pressure hydrogen fuel tank) in which hydrogen is charged in the storage place of the hydrogen fuel tank 116 or the storage cabinet of the hydrogen fuel tank 116 next to the snack bar. The replacement method is a method of separating the hydrogen fuel tank 116 attached to the fuel cell drone 100 by a single press, and pushing the recharged hydrogen fuel tank 116 into the fuel cell drone 100 to fix the hydrogen fuel tank 116 to the fuel cell drone 100.

The replaced hydrogen fuel tank 116 is inserted into the cabinet of the hydrogen fuel tank 116 to be recharged. That is, if the hydrogen fuel tank 116 is inserted, the cabinet of the hydrogen fuel tank 116 determines whether to charge by sensing the weight and pressure of the corresponding hydrogen fuel tank 116. The cabinet of the hydrogen fuel tank 116 injects hydrogen gas into the hydrogen fuel tank 116 which needs to be charged through a charging port to charge the hydrogen fuel tank 116.

If the fuel is completely charged, the fuel cell drone 100 repeatedly performs the operation S150, operation S200, operation S250, operation S300, operation S350, operation S400, operation S450, operation S500, operation S550, and operation S600 until the second half of the golf rounding is terminated.

When the eighteenth round of rounding ends, the caddy terminal 200 transmits a rounding termination signal to the fuel cell drone 100. Upon receiving the rounding termination signal (operation S750; Yes), the fuel cell drone 100 selects the best swing and putter golfer (operation S800).

The fuel cell drone 100 transmits the swing videos of the golfers 20 to the golfer terminals 300. The fuel cell drone 100 extracts the swing video or image including the best swing of each of the golfers 20 to transmit the extracted swing video or image to the golfer terminals 300 belonging to the same rounding group. The fuel cell drone 100 receives a voting result for the swing videos or images provided from the golfer terminals 300. The fuel cell drone 100 selects the golfer 20 who is the best swing and putter golfer based on the voting result to transmit the golfer 20 to the caddy terminal 200 and the golfer terminals 300. The caddy 30 provides a gift to the golfer 20 who is the best swing and putter golfer displayed on the caddy terminal 200.

The fuel cell drone 100 transmits recommendation information to the golfer terminal 300 (operation S850). The fuel cell drone 100 photographs the clothes, shoes, accessories, and clubs of the golfers 20 from the swing video photographed during golf rounding. The fuel cell drone 100 recommends clothes, shoes, accessories, clubs, and the like to the golfers 20 based on the photographed video. At this time, the fuel cell drone 100 recommends an optimal product in consideration of the swing analysis result, brand statistics, club statistics, size, and flying distance of the golfer 20. The fuel cell drone 100 may also recommend a lesson company in connection with an external golf lesson company registered in the service providing server 400.

Although it is described that the fuel cell drone 100 uses the hydrogen fuel cell as the power source, it is understood that this is just an example and one or more other exemplary embodiments are not limited thereto. For example, the fuel cell drone 100 may also use the battery as the power source. At this time, because the fuel cell drone 100 using the hydrogen fuel cell as the power source may fly for a long time, the fuel cell drone 100 may be used during 9 holes by charging once.

On the other hand, because the fuel cell drone 100 using the battery as the power source may fly only for about 20 to 30 minutes with the charged battery, it is difficult for the fuel cell drone 100 to be operated even during one hole.

Accordingly, the fuel cell drone 100 using the battery as the power source may support only some of the above-described services. The fuel cell drone 100 provides service at the first driver swing, lands on the roof of the cart to be charged from the cart, and then goes to the green to provide service.

Because the cart is generally an electric vehicle, the cart may be mounted with a large battery to charge the fuel cell drone 100. The fuel cell drone 100 may be mounted with a plurality of batteries and may also be replaced with spare batteries when landing on the cart.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A fuel cell drone of a system for providing service on a golf course comprising:
    a hydrogen fuel tank in which hydrogen is charged;
    a power pack configured to generate power to drive the fuel cell drone using the hydrogen in the hydrogen fuel tank;
    a controller configured to move the fuel cell drone to a docking station or a gas supply place in response to determining that an amount of hydrogen remaining in the hydrogen fuel tank is below a set value;
    a golfer register configured to register a plurality of golfers and golfer terminals belonging to a rounding group;
    a camera configured to photograph a golfer image and a swing video;
    an analysis information provider configured to transmit swing analysis information corresponding to the swing video to the golfer terminal; and
    a drop location detector configured to detect a ball drop location based on the swing video;
    a movement location detector configured to detect one of the ball drop location detected by the drop location detector and an average intermediate point of the ball drop locations of the plurality of golfers as the movement location; and
    a swing order setter configured to calculate a distance between the ball drop locations of the plurality of golfers and the hole cup, and arranges the calculated distances in descending order to set the swing order of the plurality of golfers.

2. The fuel cell drone of claim 1,
    wherein the controller blocks a drive power output of the power pack after the fuel cell drone is docked in the docking station.

3. The fuel cell drone of claim 1,
    wherein the hydrogen fuel tank comprises a main hydrogen fuel tank and a sub-hydrogen fuel tank,
    wherein the fuel cell drone further comprises a hydrogen supply valve configured to selectively supply the hydrogen from the main hydrogen fuel tank and the sub-hydrogen fuel tank to the power pack, and
    wherein the controller controls, in response to determining that the amount of hydrogen remaining in the main hydrogen fuel tank is less than the set value, the hydrogen supply valve to block the hydrogen supply from the main hydrogen fuel tank to the power pack and to supply the hydrogen in the sub-hydrogen fuel tank to the power pack.

4. The fuel cell drone of claim 1,
    wherein the golfer register registers the golfer by storing golfer information and golfer terminal information corresponding to the golfer image in connection with the golfer image.

5. The fuel cell drone of claim 1, further comprising: a course information provider configured to detect golfer terminal information of the golfer preparing for swing based on the golfer image and provide course information to the golfer terminal,
    wherein the course information provider detects golfer terminal information connected to the golfer image obtained by photographing the golfer preparing for swing by the camera, and transmits course information including at least one of an image, a notification, a strategy method, current wind direction and wind speed, and temperature of a hole course to a golfer terminal corresponding to the detected golfer terminal information, and
    wherein the strategy method includes at least one of a club type, a swing direction, and an expected ball drop location.

6. The fuel cell drone of claim 1,
    wherein the controller controls a flight module to move to the docking station, if a first half round of the rounding group is over.

7. The fuel cell drone of claim 1, further comprising: a recorder configured to record at least one of scores, green in regulations, whether the ball is landed on a fairway, and a number of putts of the plurality of golfers based on the swing video.

8. The fuel cell drone of claim 1, further comprising: a recommendation information provider configured to transmit to the golfer terminal recommendation information if a round of the rounding group is completed, wherein the recommendation information comprises at least one of a swing analysis result, brand statistics, club statistics, a size, and a flying distance, each obtained based on the swing video.

9. A system for providing service on a golf course using a fuel cell drone comprising:
    a fuel cell drone of any one of claims 1 to 3, 4, 5, and 6 to 8; and
    a service providing server configured to generate swing analysis information based on a swing video of a golfer and one of a recommended swing video and a practice swing video, and transmit the swing analysis information to at least one of the fuel cell drone and a golfer terminal.

10. A method for providing service on a golf course using a fuel cell drone, the method comprising:
    sensing, by a fuel cell drone, an amount of hydrogen remaining in a hydrogen fuel tank;
    generating, by the fuel cell drone, power to drive the fuel cell drone using the hydrogen in the hydrogen fuel tank; and
    if the sensed amount of remaining hydrogen is below a set value during flight with the drive power, charging, by the fuel cell drone, hydrogen by being docked to a docking station or by moving to a gas supply place;
    registering, by the fuel cell drone, a plurality of golfers and golfer terminals belonging to a rounding group;
    photographing, by the fuel cell drone, a swing video of the golfer;
    transmitting, by the fuel cell drone, swing analysis information corresponding to the swing video to the golfer terminal; and detecting, by the fuel cell drone, a ball drop location based on the swing video:

detecting by the fuel cell drone, one of the ball drop location detected based on the swing video and an average intermediate point of the ball drop locations of the plurality of golfers as the movement location; and calculating, by the fuel cell drone, a distance between the ball drop locations of the plurality of golfers and the hole cup, and arranging the calculated distances in descending order to set the swing order of the plurality of golfers.

* * * * *